US010788677B2

(12) United States Patent
Geng et al.

(10) Patent No.: US 10,788,677 B2
(45) Date of Patent: Sep. 29, 2020

(54) FRESNEL ASSEMBLY FOR LIGHT REDIRECTION IN EYE TRACKING SYSTEMS

(71) Applicant: Facebook Technologies, LLC, Menlo Park, CA (US)

(72) Inventors: Ying Geng, Sammamish, WA (US); Yusufu Njoni Bamaxam Sulai, Bothell, WA (US); Andrew John Ouderkirk, Redmond, WA (US); Brian Wheelwright, Sammamish, WA (US); Jacques Gollier, Redmond, WA (US); Alexander Sohn, Bellevue, WA (US); Robin Sharma, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/723,305

(22) Filed: Oct. 3, 2017

(65) Prior Publication Data

US 2019/0101767 A1 Apr. 4, 2019

(51) Int. Cl.
*G02B 27/14* (2006.01)
*G02B 27/01* (2006.01)
(Continued)

(52) U.S. Cl.
CPC ............. *G02B 27/141* (2013.01); *G02B 3/08* (2013.01); *G02B 27/017* (2013.01);
(Continued)

(58) Field of Classification Search
CPC .................. G02B 27/143; G06F 3/013
See application file for complete search history.

(56) References Cited

U.S. PATENT DOCUMENTS 7,656,585 B1 * 2/2010 Powell .................. G02B 5/09
349/11
2003/0214710 A1 * 11/2003 Takahashi ............ G02B 27/225
359/443
(Continued)

FOREIGN PATENT DOCUMENTS

CN 102955255 A 3/2013
CN 105934902 A 9/2016
(Continued)

OTHER PUBLICATIONS

Chinese Patent Office, Office Action, Chinese Patent Applicaion No. 2018/1150298.9, dated Aug. 4, 2020 21 pages.
21 pages.

*Primary Examiner* — Lixi C Simpson
(74) *Attorney, Agent, or Firm* — Fenwick & West LLP

(57) ABSTRACT

A head-mounted device (HMD) comprises a display element, a Fresnel assembly, an illumination source, and a camera assembly. The display element outputs image light in a first band of light through a display surface. The optics block directs light from the display element to a target region (e.g., includes a portion of a user's face, eyes, etc.). The Fresnel assembly transmits light in the first band and directs light in a second band different than the first band to a first position. The source illuminates the target area with light in the second band. The camera is located in the first position and captures light in the second band corresponding to light reflected from the target area that is then reflected by the Fresnel assembly toward the camera. A controller may use the captured light to determine tracking information for areas of a user's face (e.g., eyes).

15 Claims, 8 Drawing Sheets

(51) Int. Cl.
*G06F 3/01* (2006.01)
*G02B 3/08* (2006.01)

(52) U.S. Cl.
CPC ....... *G02B 27/0172* (2013.01); *G02B 27/143* (2013.01); *G06F 3/013* (2013.01); *G02B 2027/011* (2013.01); *G02B 2027/015* (2013.01); *G02B 2027/0123* (2013.01); *G02B 2027/0138* (2013.01); *G02B 2027/0178* (2013.01); *G02B 2027/0187* (2013.01)

(56) References Cited

U.S. PATENT DOCUMENTS

| | | |
|---|---|---|
| 2004/0227992 A1 | 11/2004 | Putilin et al. |
| 2010/0094161 A1 | 4/2010 | Kiderman et al. |
| 2012/0002295 A1* | 1/2012 | Dobschal ................. G02B 3/08 359/630 |
| 2015/0070481 A1* | 3/2015 | S .............................. G06F 3/013 348/78 |
| 2016/0070103 A1* | 3/2016 | Yoon ........................ G02B 3/08 345/633 |
| 2016/0223819 A1* | 8/2016 | Liu ..................... G02B 27/0172 |
| 2017/0017842 A1* | 1/2017 | Ma ..................... G06K 9/00597 |
| 2017/0192499 A1 | 7/2017 | Trail |
| 2017/0329398 A1* | 11/2017 | Raffle ................ G02B 27/0093 |
| 2017/0336552 A1 | 11/2017 | Masuda et al. |
| 2018/0003980 A1 | 1/2018 | Wilson et al. |
| 2018/0113508 A1* | 4/2018 | Berkner-Cieslicki ...................... G02B 27/0172 |
| 2018/0203505 A1* | 7/2018 | Trail ....................... G06F 3/013 |
| 2018/0239177 A1 | 8/2018 | Oh |
| 2018/0275409 A1 | 9/2018 | Gao et al. |
| 2019/0101757 A1* | 4/2019 | Martinez ............ G02B 27/0172 |

FOREIGN PATENT DOCUMENTS

| | | |
|---|---|---|
| CN | 106164745 A | 11/2016 |
| CN | 106797422 A | 5/2017 |
| CN | 106932904 A | 7/2017 |
| CN | 107065049 A | 8/2017 |
| WO | WO 2017/079689 A1 | 5/2017 |

* cited by examiner

FRESNEL ASSEMBLY FOR LIGHT REDIRECTION IN EYE TRACKING SYSTEMS

BACKGROUND

The present disclosure relates generally to light redirection, and specifically relates to a Fresnel assembly for light redirection in eye tracking systems.

Eye tracking refers to the process of detecting the direction of a user's gaze, which may comprise detecting an orientation of an eye in 3-dimentional (3D) space. Eye tracking in the context of headsets used in, e.g., virtual reality and/or augmented reality applications can be an important feature. Conventional systems commonly use, e.g., a number of infrared light sources to illuminate the eye light, and a camera is used to image a reflection of the light sources from the eye. Traditionally, eye tracking systems use beam splitters to redirect infrared light reflected from the eye to the camera. However, beam splitters are often large, cumbersome, and unsuitable for HMDs used in augmented reality (AR), mixed reality (MR), and virtual reality (VR) systems.

SUMMARY

A Fresnel assembly transmits (e.g., partially or fully) light in a first band (e.g., visible light) and redirects some, or all of light in a second band (e.g., infrared light) to one or more locations. The Fresnel assembly includes a plurality of surfaces that act to redirect light in the second band. The plurality of surfaces may be coated with a dichroic material that is transmissive in the first band and reflective in the second band. In some embodiments, an immersion layer is overmolded onto the Fresnel assembly to form an immersed Fresnel assembly. The immersion layer may be index matched to the Fresnel assembly. Additionally, in some embodiments, one or more surfaces of the immersed Fresnel assembly may be shaped (e.g., concave, convex, asphere, freeform, etc.) to adjust optical power of the immersed Fresnel assembly. The Fresnel assembly may be integrated into a head-mounted display (HMD).

In some embodiments, a HMD includes a display element, an optics block, a Fresnel assembly, an illumination source, and a camera assembly. The display element outputs image light in a first band (e.g., visible light) of light through a display surface of the display element. The optics block directs light from the display element to an eyebox (a region in space occupied by an eye of the user). The Fresnel assembly transmits light in the first band and directs light in a second band (e.g., infrared light) different than the first band to a first position. The illumination source (e.g., part of a tracking system) illuminates a target region (eyes and/or portion of the face) with light in the second band. The camera (e.g., part of an eye and/or face tracking system) is located in the first position, and is configured to capture light in the second band corresponding to light reflected from the target region of the user and reflected by the Fresnel assembly.

In some embodiments, the Fresnel assembly may be non-wavelength sensitive (e.g. it could be a non-immersed, uncoated surface, or it could have a partially-reflective coating and is immersed). It transmits a portion of the light from the display and directs it to the eyebox. It also directs parts of the display light outside of the eyebox. The camera is positioned such that the light that comes from the eye is reflected off of the Fresnels and is captured by the camera.

Additionally, in some embodiments, the HMD includes a controller (e.g., part of the tracking system) that generates tracking information (e.g., gaze location and/or facial expressions).

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
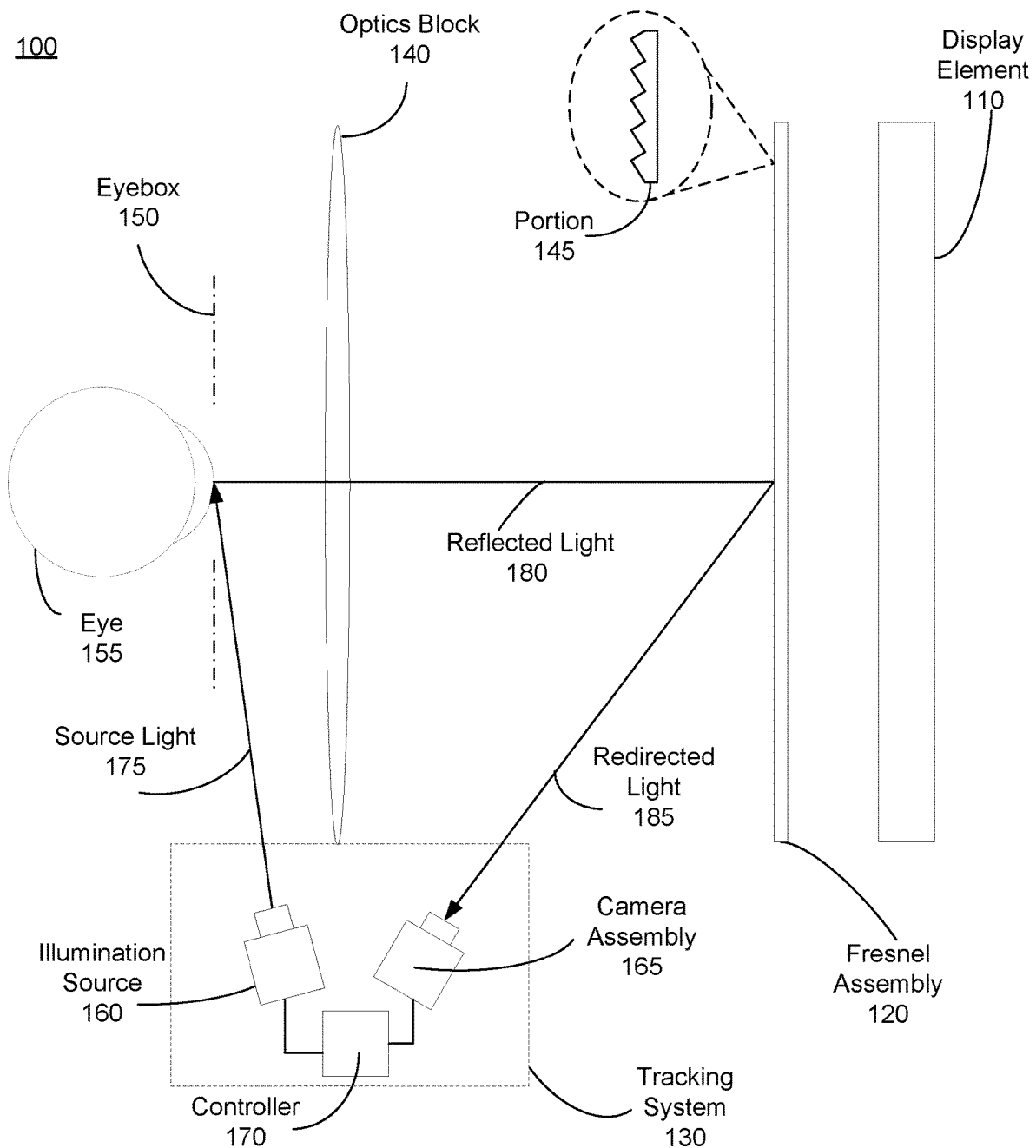
FIG. 1 is a diagram of a cross section of a portion of a display block of an HMD (not shown), in accordance with an embodiment.

FIG. 1 is a diagram of a cross section 100 of a portion of a display block of an HMD (not shown), in accordance with an embodiment. As shown in FIG. 1, the display block includes a display element 110, a Fresnel assembly 120, and a tracking system 130. In some embodiments, the display block 100 may also include an optics block 140.

The display element 110 displays images to the user. In various embodiments, the display element 110 may comprise a single electronic display panel or multiple electronic display panels (e.g., a display for each eye of a user). Examples of the display element 110 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other display, or some combination thereof. In some embodiments, the display element 110 is a waveguide display. The display element 110 emits content within a first band of light (e.g., in a visible band).

The Fresnel assembly 120 transmits light in the first band and reflects light within a second band. For example, the Fresnel assembly 120 may transmit light within a visible band (e.g., 400-700 nanometers (nm)), and may reflect light within an infrared (IR) band (e.g., above 780 nm). The Fresnel assembly 120 comprises a first surface that includes plurality of reflective surfaces that form a Fresnel lens, a portion 145 of the plurality of reflective surfaces are illustrated in FIG. 1. In some embodiments, the plurality of reflective surfaces are coated with a dichroic film that is transmissive in the first band and reflective in the second band. In other embodiments, the plurality of the reflective surfaces are coated with a partial reflective coating. As discussed in detail below with regard to, e.g., FIGS. 4-6 the plurality of reflective surfaces can be configured to reflect light in the second band to different positions, and the positions. The Fresnel assembly 120 can partially transmit light, and partially reflect light, for any light band of interest. For example, without coating the Fresnel assembly 120 can weakly reflect light by Fresnel reflection, and transmit the rest of the light. In contrast, with coatings, the transmission/reflection ratio can be adjusted. Alternatively, the Fresnel assembly 120 can transmit light with one polarization, and reflect light with an orthogonal polarization. This can be useful especially for polarization based viewing optics, where light is transmitted in one single polarization. Additionally, while not shown in FIG. 1, in some embodiments, the Fresnel assembly 120 is coupled directly to a display surface of to the display element.

The Fresnel assembly 120 is at least partially transmissive to light in the first band. In some embodiments, the Fresnel assembly 120 may increase or decrease the optical power of light in the first band from the display element 110. Additionally, for light in the first band, the Fresnel assembly 120 may reduce fixed pattern noise (i.e., the screen door effect). As is described in the descriptions of FIGS. 8A and 8B, the Fresnel assembly 120 blurs light emitted from individual pixels in the display element 110. This blurring allows for dark spots between individual colors to be masked.

The optics block 140 directs light to a target region. The target region includes a portion of the user's face. In some embodiments, the target region includes one or both eyes (e.g., the eye 155) of the user. For ease of illustration, the target region in FIG. 1 is represented as an eyebox 150. The eyebox 150 is a region in space that is occupied by an eye 155 of a user of the HMD. In an embodiment, the optics block 140 includes one or more optical elements and/or combinations of different optical elements. For example, an optical element is an aperture, a Fresnel lens, a convex lens, a concave lens, a filter, or any other suitable optical element that affects the image light emitted from the display element 110. In some embodiments, one or more of the optical elements in the optics block 140 may have one or more coatings, such as anti-reflective coatings.

Magnification of the image light by the optics block 140 allows the display element 110 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 140 is designed so its effective focal length is larger than the spacing to the display element 110, which magnifies the image light projected by the display element 110. Additionally, in some embodiments, the amount of magnification is adjusted by adding or removing optical elements.

In some embodiments, the optics block 140 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the display element 110 for display is pre-distorted, and the optics block 140 corrects the distortion when it receives image light from the electronic display element 110 generated based on the content.

The tracking system 130 tracks movement of the target region. Some or all of the tracking system 130 may or may not be in a line of sight of a user wearing the HMD. The tracking system 130 is typically located off-axis to avoid obstructing the user's view of the display element 110, although the tracking system 130 may alternately be placed elsewhere. Also, in some embodiments, there is at least one tracking system 130 for different portions of the user's face (e.g., a tracking system for the user's left eye and a second tracking system for the user's right eye). In some embodiments, only one tracking system 130 may track multiple target regions.

The tracking system 130 may include one or more illumination sources 160, a camera assembly 165, and a controller 170. The tracking system 130 determines tracking information using data (e.g., images) captured by the camera assembly 165 of the target region (e.g., the eye 155). Tracking information describes a position of a portion of the user's face. Tracking information may include, e.g., facial expressions, gaze angle, eye orientation, inter-pupillary distance, vergence depth, some other metric associated with tracking an eye, some other metric associated with tracking a portion of the user's face, or some combination thereof. Some embodiments of the tracking unit have different components than those described in FIG. 1.

The illumination source 160 illuminates the target region (e.g., the eyebox 150) with light in the second band of light (i.e., source light 175) that is different from the first band of light associated with content from the display element 110. Examples of the illumination source 160 may include: a laser (e.g., a tunable laser, a continuous wave laser, a pulse laser, other suitable laser emitting infrared light), a light emitted diode (LED), a fiber light source, a light guide, another other suitable light source emitting light in the second band, or some combination thereof. In some embodiments, the illumination source can be inside the field of view of the display, and is transparent to the display light. For example, the illumination source can be a transparent light guide with small light extraction features on top. In various embodiments, the illumination source 160 may also be configured to emit light in the first band. In some embodiments, the tracking system 130 may include multiple illumination sources 160 for illuminating one or more portions of the target region. In some embodiments, the light emitted from the one or more illumination sources 160 is a structured light pattern.

Reflected light 180 (inclusive of scattered light) from the illuminated portion of the target region (e.g., the eye 155) is light in the second band that is reflected by the target region towards the Fresnel assembly 120. The reflected light 162 is redirected by the Fresnel assembly 120 toward a first position, and this redirected light is referred to as redirected light

185. Some or all of the redirected light 185 is captured by the camera assembly 165 that is located at the first position.

The camera assembly 165 captures images of the target region (e.g., the eye 155 in the eyebox 150). The camera assembly 165 includes one or more cameras that are sensitive to light in at least the second band (i.e., light emitted by the illumination source 160). In some embodiments, the one or more cameras may also be sensitive in other bands of light (e.g., the first band). In some embodiments, a camera may be based on single-point detection (e.g., photodiode, balanced/matched photodiodes, or avalanche photodiode), or based on one or two-dimensional detector arrays (e.g., linear photodiode array, CCD array, or CMOS array). In some embodiments, the sensor plane of the camera is tilted with regards to the camera's lens, following the Scheimpflug condition, such that the image can be in focus across the whole sensor plane. In some embodiments, the camera assembly 165 may include multiple cameras to capture light reflected from the target region. The camera assembly 165 includes at least one camera located at the first position. Accordingly, the camera assembly 165 captures images of the target region (e.g., the eye 155) using the redirected light 164.

The controller 170 determines tracking information using images from the camera assembly 165. For example, in some embodiments, the controller 170 identifies locations of reflections of light from the one or more illumination sources 160 in an image of the target region. The controller 170 determines a position and an orientation of the eye 155 and/or portions of the face in the target region based on the shape and/or locations of the identified reflections. In cases where the target region is illuminated with a structured light pattern, the controller 170 can detect distortions of the structured light pattern projected onto the target region, and can estimate a position and an orientation of the eye 155 and/or portions of the face based on the detected distortions. The controller 170 can also estimate a pupillary axis, a gaze angle (e.g., corresponds to a foveal axis), a translation of the eye, a torsion of the eye, and a current shape of the eye 155 based on the image of the illumination pattern captured by the camera 155.

Note that in the illustrated embodiment, the reflected light 180 passes through the optics block 140 prior to incidence on the Fresnel assembly 120. In alternate embodiments (not shown), the Fresnel assembly 120 is closer to the eyebox 150 than the optics block 140 (i.e., a distance between the optics block 140 and the display element 110 is less than a distance between the Fresnel assembly 120 and the display element 110) and light in the second band reflected from the eye 155 does not pass through an optics block 140 before it is directed by the Fresnel assembly 120 to a first position.

Figure 2:
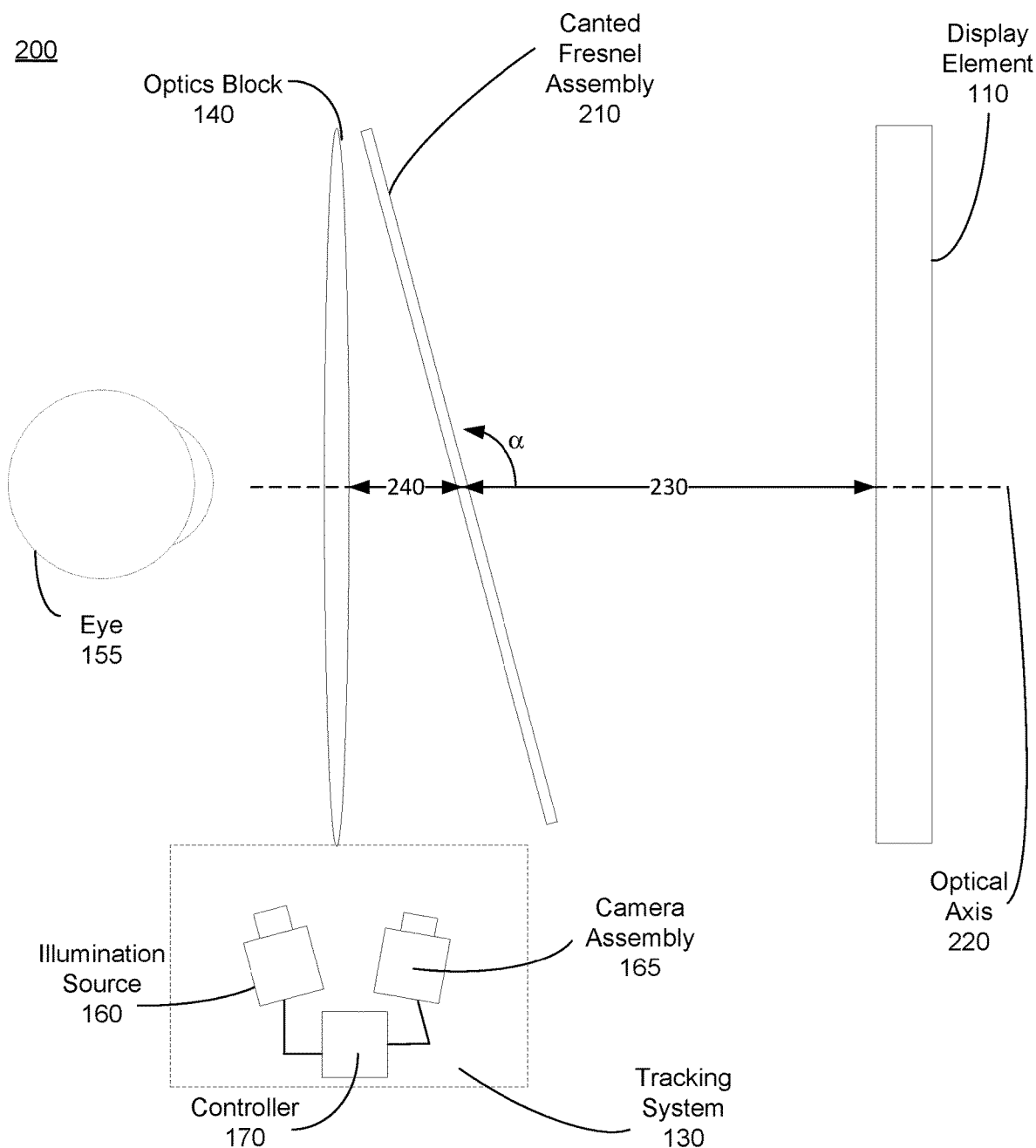
FIG. 2 is a diagram of a cross section of a portion of a display block of an HMD (not shown) with a canted Fresnel assembly, in accordance with an embodiment.

FIG. 2 is a diagram of a cross section 200 of a portion of a display block of an HMD (not shown) with a canted Fresnel assembly 210, in accordance with an embodiment. The portion of the display block includes the display element 110, the canted Fresnel assembly 210, the optics block 140, and the tracking system 130. The canted Fresnel assembly 210 is substantially the same as the Fresnel assembly 120, except that it is canted with respect to an optical axis 220 and is positioned at a first distance 230 from the display element 110.

The optical axis 220 passes through the display element 110, the canted Fresnel assembly 210, and the optics block 140. In some embodiments, the optical axis 220 bisects one or more of the display element 110, the canted Fresnel assembly 210, the optics block 140, or some combination thereof. The canted Fresnel assembly 210 is positioned at a tilt angle, α, with respect to the optical axis 220. The tilt angle is determined by system level trade-offs between stray light from the draft facets, how normal the camera's view of the eye is needed, how compact the Fresnel assembly needs to be, etc. Reasonable tilt angles would be smaller than 30 degrees.

In this embodiments, the canted Fresnel assembly 210 is substantially closer to the optics block 140 than the display element 110. The canted Fresnel assembly 210 is located the first distance 230 from the display element 110, and a second distance 240 from the optics block 140. The first distance 230 is substantially larger than the second distance 240. If the Fresnel assembly is canted, it's preferred to put it behind the optics block 140, and with a large distance from the display. If it's in between the eye and the optics block 140, it wants to be close to non-canted such that it would not increase the design eye-relief. When it's put behind the optics block 140, it is usually better to put Fresnel surfaces far away from the display, such that the eye would not be able to focus on the Fresnel grooves or imperfections of immersion. If the Fresnels/prisms also function as screen-door-reduction films, then it can potentially be put very close to the display.

Figure 3:
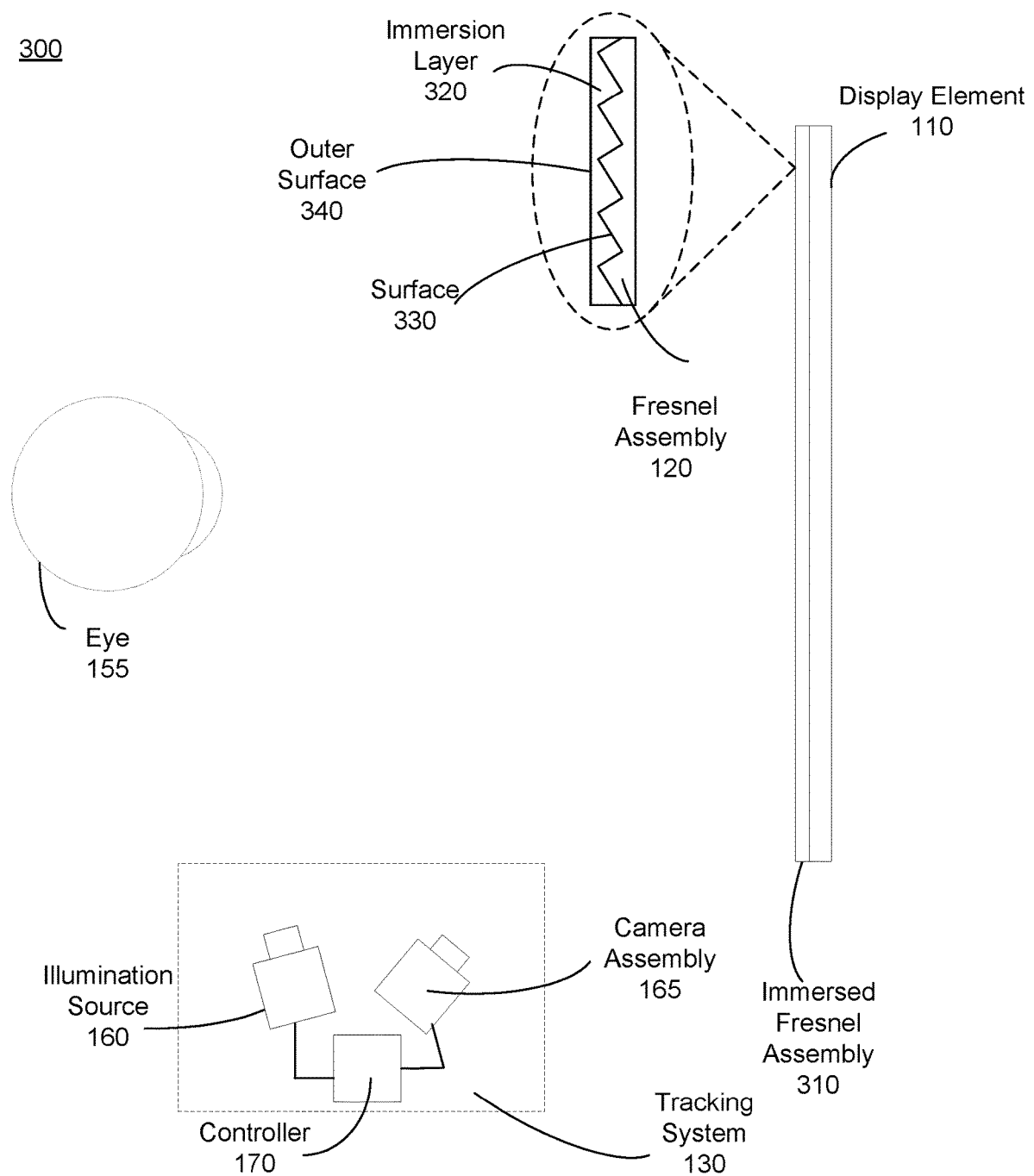
FIG. 3 is a diagram of a cross section of a portion of a display block of an HMD (not shown) with an immersed Fresnel assembly, in accordance with an embodiment.

FIG. 3 is a diagram of a cross section 300 of a portion of a display block of an HMD (not shown) with an immersed Fresnel assembly 310, in accordance with an embodiment. The portion of the display block includes the display element 110, the immersed Fresnel assembly 310, and the tracking system 130.

The immersed Fresnel assembly 310 is the Fresnel assembly 120 overmolded with an immersion layer 320. The immersed Fresnel assembly 310 is coupled to the display element 110. In some embodiments, the immersed Fresnel assembly 310 is directly coupled to a display surface of the display element 110. In alternate embodiments, the immersed Fresnel assembly 310 and the display element 110 are separated by one or more intermediate layers (e.g., optical films). The immersed Fresnel assembly 310 can be located in any location between the display 110 and the eye 155.

The immersion layer 320 is index matched to a material that makes up the Fresnel assembly 120. As the immersion layer 320 is index matched to the Fresnel assembly 120, light in the first band from the display element 110 is not affected by the Fresnel assembly 120. For example, due to the substantially matched index, light in the first band is not refracted by the plurality of surfaces (e.g., surface 330) at the interface between the immersion layer 320 and the Fresnel assembly 120. Instead light in the first band interacts with the immersed Fresnel assembly 310 as a block of a material of a single index. The immersion layer can be a glue or UV curable material that is of similar refractive index to the Fresnels. Or, a different process can be, two matching Fresnels can be sandwiched together, with index-matching glue in between. In some embodiments, both match Fresnels are the same material (such as a UV curable material), and no index-match glue is needed in between.

The immersed Fresnel assembly 310 includes an outer surface 340 (e.g., substrate). In this embodiment, the outer surface 340 is flat. In alternate embodiments, the outer surface 340 is shaped to provide some adjustment to optical power of light being transmitted by the immersed Fresnel assembly 310. For example, the output surface may be concave, convex, an asphere, spherical, a freeform surface, flat, or some other shape. In some embodiments, the Fresnel assembly 120 is coupled to on a substrate that is not flat (e.g., curved, or some other shape).

In this embodiment, the plurality of surfaces of the Fresnel assembly 120 have a dichroic coating that is transmissive in the first band of light (e.g., visible light), but is reflective in the second band of light (e.g., IR light). In some embodiments, the coatings may be sputtered onto one or more of the surfaces, laminated onto one or more of the surfaces, etc. Accordingly, as discussed below with regard to FIGS. 4-6, light in the second band incident on the surfaces are reflected (e.g., toward the camera assembly 155). In some embodiments, the coating maybe a partial reflective coating. In other embodiments, the coating may be a polarization beam splitter coating. Moreover, in some embodiments, one or more of junctions between surfaces of the Fresnel assembly 120 may be softened (i.e., smoothed to have a radius of curvature v. a sharp edge formed by two intersecting surfaces). Softening of a junction can facilitate lamination of a coating onto the plurality of surfaces of the Fresnel structure.

Figure 4:
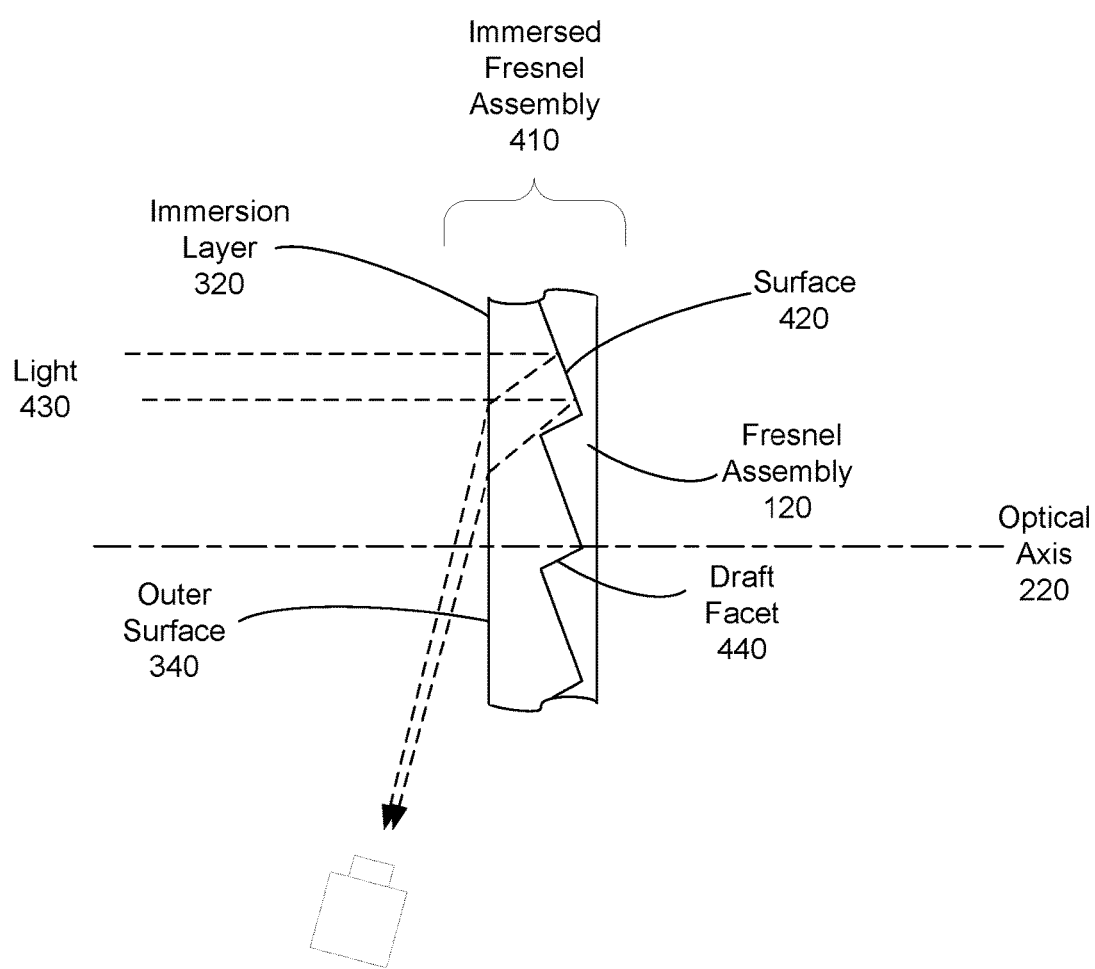
FIG. 4 is a diagram of a cross section of a portion of an immersed Fresnel assembly 410, in accordance with an embodiment.

FIG. 4 is a diagram of a cross section 400 of a portion of an immersed Fresnel assembly 410, in accordance with an embodiment. The portion of the immersed Fresnel assembly 410 includes a portion of the Fresnel assembly 120 and a portion of the immersion layer 320 that is coupled to the Fresnel assembly 120.

Light 430 in the second band is incident on a surface 420 of the plurality of surfaces of the Fresnel assembly 120. In this embodiment, the plurality of surfaces have a dichroic coating that is transmissive in the first band and reflective in the second band. Accordingly, the light 430 is reflected toward a first position (e.g., occupied a camera of the camera assembly 165). Some or all of the surfaces of the Fresnel assembly 120 may be optimized to reduce stray light. For example, a slope of a draft facet 440 may be shaped such that it aligns with a chief ray angle exitance ray going into the camera's entrance pupil. Note that light might hit the wrong Fresnel facet in two scenarios, on its way to the Fresnel, and after it gets reflected by the Fresnel. In some embodiments where the view of the eye 155 is close to normal, and rays hit the Fresnel assembly 120 at close to normal and rarely hit the wrong Fresnel facet on the way in, so it's better to align the chief ray such that it would avoid hitting the wrong Fresnel facet on the way out and into the camera assembly 165. In other embodiments, some tradeoffs may be made such that stray light can be minimized considering both scenarios. An alternative way to remove stray light is to deactivate the "unused" Fresnel draft facet, such that it wouldn't be reflective and give stray light. In some embodiments, only the "useful" facet is coated to reflect light, and the draft facet is not coated (this can be done by directional coating techniques) or painted black. Note that prior to arriving at a camera of the camera assembly 165, in the immersed Fresnel assembly 410, the light 430 is refracted at the outer surface 340. Accordingly, by using a high index material (e.g., 2.5) for the immersion layer 320 and the Fresnel assembly 120, the light 430 can be bent at a greater angle relative to a low index material (e.g., 1.3). And a greater bending of the light 430 may be useful in reducing a form factor of the HMD.

Another artifact to avoid is Fresnel visibility to the view's eye. If the "unused" draft facet reflects a lot of visible light into the viewer's eye, the Fresnel facets may be visible. In some embodiments, optimum co-designs of the coating and the Fresnel draft angle mitigates this artifact. In alternative embodiments, the draft facet is uncoated and becomes invisible for the see-through transmission path. In other embodiments, the Fresnel pitch is small (smaller than 400 microns) such that it is difficult for the eye to resolve the individual facets.

Note that in alternate embodiments, the first position is also occupied by the illumination source 165. In these embodiments, the illumination source 160 illuminates the Fresnel assembly 120 with light in the second band, and the Fresnel assembly 120 redirects the light toward an eyebox. For further suppression of stray light into the camera, in some embodiments, crossed polarizers or other polarization diversity methods are used to block unwanted illumination light hitting the camera.

Figure 5:
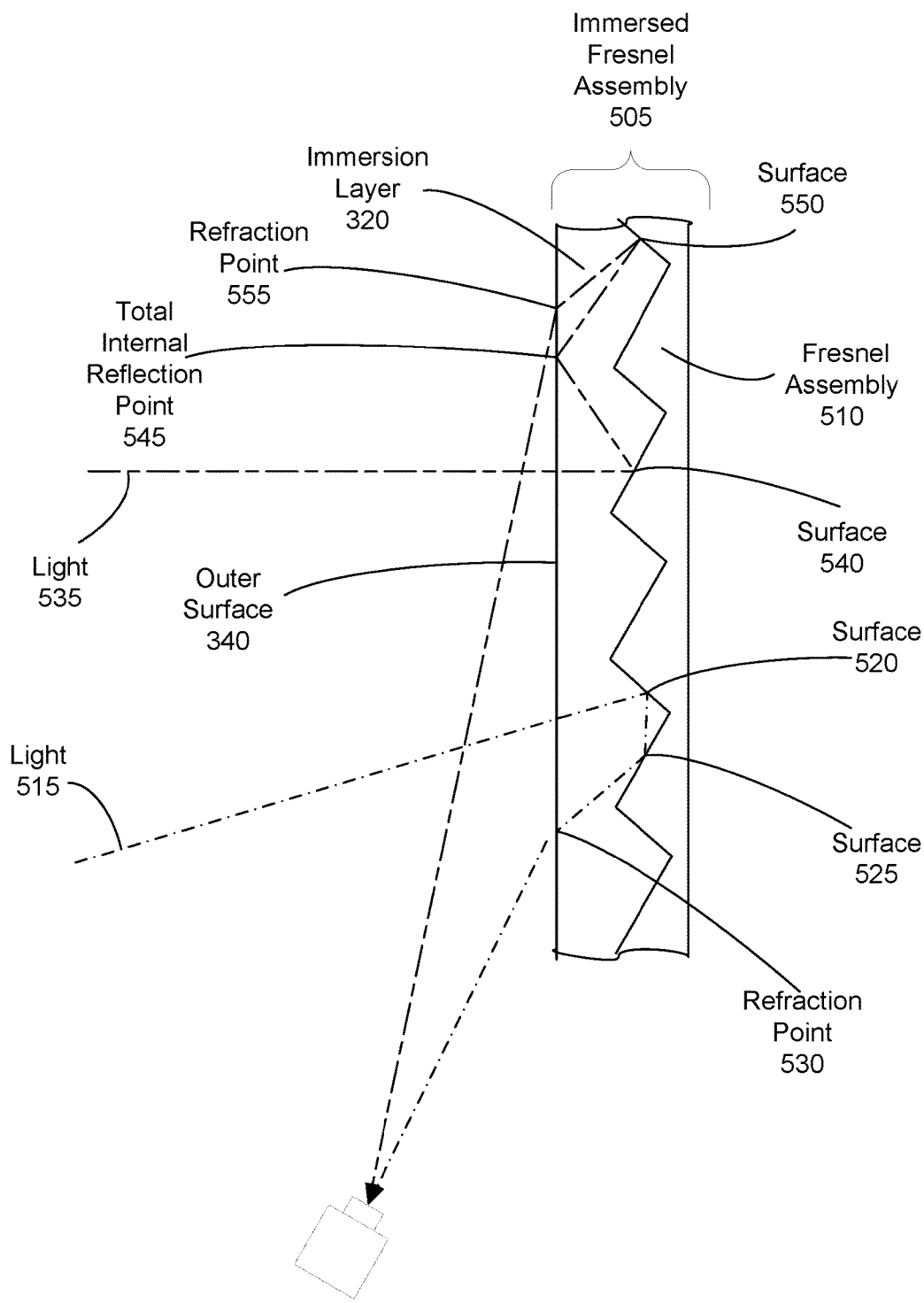
FIG. 5 is a diagram of a cross section of a portion of an immersed Fresnel assembly that captures multiple view angles, in accordance with an embodiment.

FIG. 5 is a diagram of a cross section 500 of a portion of an immersed Fresnel assembly 505 that captures multiple view angles, in accordance with an embodiment. The portion of the immersed Fresnel assembly 505 includes a portion of a Fresnel assembly 510 and a portion of the immersion layer 320 that is coupled to the Fresnel assembly 510. The Fresnel assembly 510 is substantially similar to the Fresnel assembly 120, except that, e.g., the plurality of surfaces are configured to direct light in a second band from different angles to the camera assembly 165. In this manner the camera assembly 165 is able to capture using a single camera in a single image frame multiple view angles of a target region (e.g., eye, portion of the face, or both). In some embodiments, the camera assembly 165 may capture three dimensional (3D) information that describes a portion of the eye 155.

In this embodiment, the Fresnel assembly 510 includes a plurality of surfaces. The plurality of surfaces have a dichroic coating that is transmissive in the first band and reflective in the second band. Light 515 in the second band is incident on the outer surface 340 of the immersion layer 320 at a first angle. The light 515 is refracted at the outer surface 340 toward a surface 520 of the plurality of surfaces of the Fresnel assembly 510. The surface 520 reflects the light toward a surface 525 of the plurality of surfaces, and the surface 525 reflects the light 515 toward the outer surface 340 of the immersion layer 320. The light 515 refracts at a refraction point 530 and propagates toward a first position that is occupied by a camera (e.g., a camera of the camera assembly 165). Note that the light might not follow the same paths in alternative embodiments, but in those cases, light coming from different paths can also allow for multiple views of the eye 155, or allow for paths where an illuminator can be inserted.

Concurrent with the light 515, light 535 in the second band is incident on the outer surface 340 of the immersion layer 320 at a second angle that is different than the first angle. The light 535 is refracted at the outer surface 340 toward a surface 540 of the plurality of surfaces of the Fresnel assembly 510. The surface 540 reflects the light 535 back toward a portion of the outer surface 340 at an angle such that total internal reflection occurs at a TIR point 545. The light 535 is reflected toward a surface 550 of the plurality of surfaces, and the surface 550 reflects the light 535 toward the outer surface 340 of the immersion layer 320. The light 535 refracts at a refraction point 555 and propagates toward a first position that is occupied by a camera (e.g., a camera of the camera assembly 165).

Note that the light 515 and the light 535 are representative of different view angles of a target area (e.g., eye and/or portion of the face) being imaged by the camera. And that the camera is able to capture in a single image frame both view angles of the eye. The tracking system 130 may use the captured images for generating tracking information.

In alternate embodiments, a first set of surfaces are used for one view, and another set of surface is used for a different view. For example, the surfaces of the first set may be shaped to capture light specifically for a particular view, and the surface of the second set may be shaped to capture light specifically for a different view. In this embodiments, the surfaces of the first set and the surfaces of the second set may be positioned in separate portions of the Fresnel assembly 510, interlaced across the entire Fresnel assembly 510, etc. Additionally, in some embodiments, the surfaces may be shaped and/or coated such that different polarizations of light and/or wavelengths of light correspond to different view angles that are captured by the camera.

Figure 6:
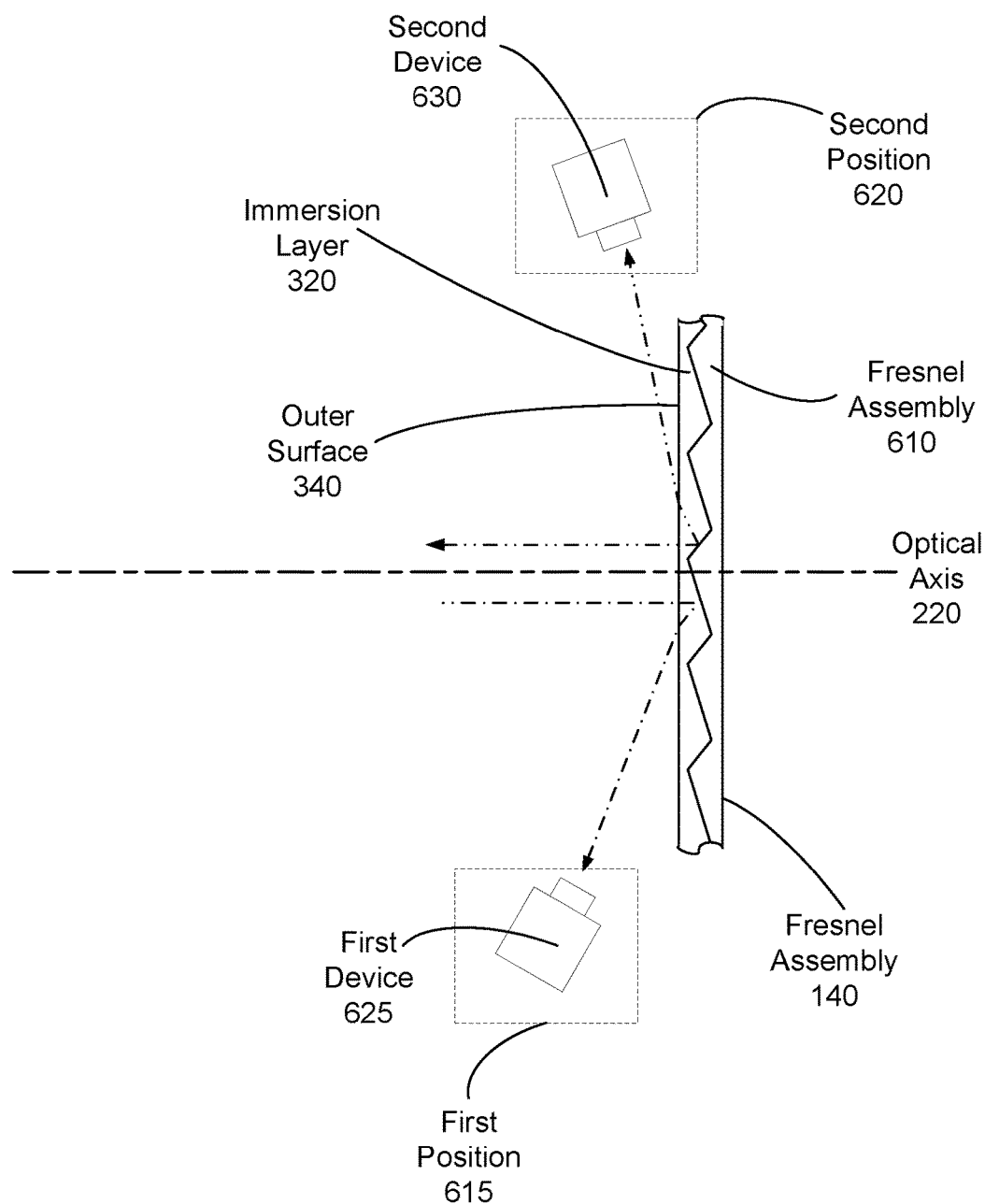
FIG. 6 is a diagram of a cross section of a portion of an immersed Fresnel assembly configured to interact with multiple positions, in accordance with an embodiment.

FIG. 6 is a diagram of a cross section 600 of a portion of an immersed Fresnel assembly 605 configured to interact with multiple positions, in accordance with an embodiment. The portion of the immersed Fresnel assembly 605 includes a portion of a Fresnel assembly 610 and a portion of the immersion layer 320 that is coupled to the Fresnel assembly 610. The Fresnel assembly 610 is substantially similar to the Fresnel assembly 120, except that, e.g., the plurality of surfaces include a first set of surfaces associated with a first position 615 and a second set of surfaces associated with a second position 620 that is different from the first position 615. The first position 615 is on a first side of the optical axis 220, and the second position 615 is on a second side of the optical axis 220. In alternate embodiments, the first position 615 and the second position 620 are symmetric with respect to the optical axis 220.

The first position 615 is occupied by a first device 625 and the second position 620 is occupied by a second device 630. The first device 625 and the second device 630 may be a camera (e.g., of the camera assembly 165), an illumination source 160, a display panel, or some combination thereof. The illumination source or the display panel can be LEDs, microLEDs, MicroOLEDs, display panels that show an arbitrary pattern (e.g., such as dots or sinusoidal patterns), some other suitable illuminators, or some combination thereof. However, at least one of the first position 615 or the second position 620 includes a camera. As illustrated in FIG. 6, the first device 625 is a camera, and the second device 630 may be a camera or an illumination source 160. In an alternate embodiment, both the first position 615 and the second position 620 include cameras of the camera assembly 165. In an alternate embodiment, the first position 615 includes a camera of the camera assembly 165 and the second position 620 includes an illumination source 160.

Figure 7A:
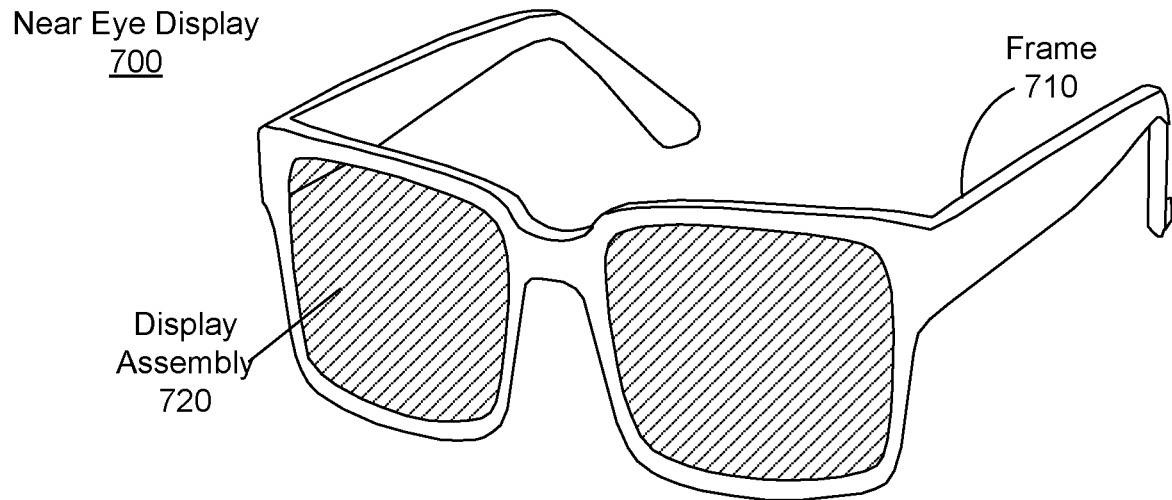
FIG. 7A is a diagram of an HMD, in one embodiment.

FIG. 7A shows a diagram of the HMD, as a near eye display 700, in one embodiment. In this embodiment, the HMD is a pair of augmented reality glasses. The HMD 700 presents computer-generated media to a user and augments views of a physical, real-world environment with the computer-generated media. Examples of computer-generated media presented by the HMD 700 include one or more images, video, audio, or some combination thereof. In some embodiments, audio is presented via an external device (e.g. speakers and headphones) that receives audio information from the HMD 700, a console (not shown), or both, and presents audio data based on audio information. In some embodiments, the HMD 700 may be modified to also operate as a virtual reality (VR) HMD, a mixed reality (MR) HMD, or some combination thereof. The HMD 700 includes a frame 710 and a display assembly 720. In this embodiment, the frame 710 mounts the near eye display 700 to the user's head. The display 720 provides image light to the user.

Figure 7B:
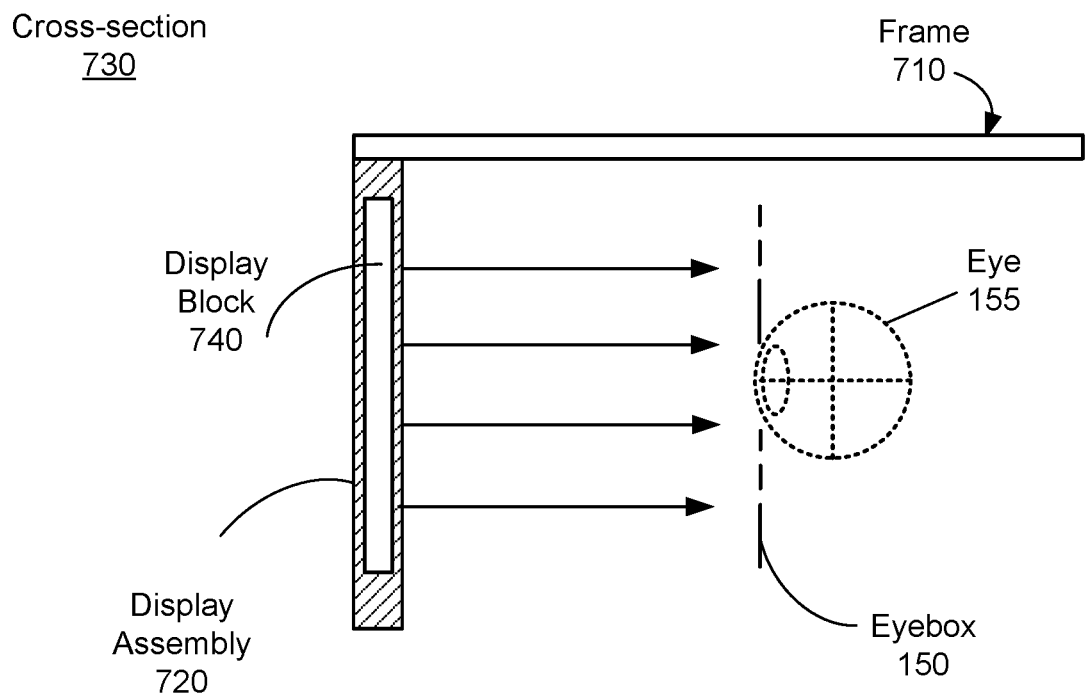
FIG. 7B is a diagram of a cross-section of the HMD, in one embodiment.

FIG. 7B shows a cross-section view 730 of the near eye display 700. This view includes the frame 710, the display assembly 720, a display block 740, and the eye 155. The display assembly 720 supplies image light to the eye 155. The display assembly 720 houses the display block 740. For purposes of illustration, FIG. 7B shows the cross section 730 associated with a single display block 740 and a single eye 155, but in alternative embodiments not shown, another display block which is separate from the display block 730 shown in FIG. 7B, provides image light to another eye of the user.

The display block 740, as illustrated below in FIG. 7B, is configured to combine light from a local area with light from computer generated image to form an augmented scene. The display block 740 is also configured to provide the augmented scene to the eyebox 150 corresponding to a location of a user's eye 155. The eyebox 150 is a region of space that would contain a user's eye while the user is wearing the HMD 700. The display block 740 may include, e.g., a waveguide display, a focusing assembly, a compensation assembly, or some combination thereof. The display block 740 is an embodiment of the display blocks discussed above with regard to FIGS. 1-3. Additionally, the display block 720 includes may include an immersed Fresnel assembly as discussed above with regard to FIGS. 4-6.

The HMD 700 may include one or more other optical elements between the display block 740 and the eye 155. The optical elements may act to, e.g., correct aberrations in image light emitted from the display block 740, magnify image light emitted from the display block 740, some other optical adjustment of image light emitted from the display block 740, or some combination thereof. The example for optical elements may include an aperture, a Fresnel lens, a convex lens, a concave lens, a filter, a grating, a waveguide element, or any other suitable optical element that affects image light. The display block 740 may be composed of one or more materials (e.g., plastic, glass, etc.) with one or more refractive indices that effectively minimize the weight and widen a field of view of the HMD 700.

Figure 8A:
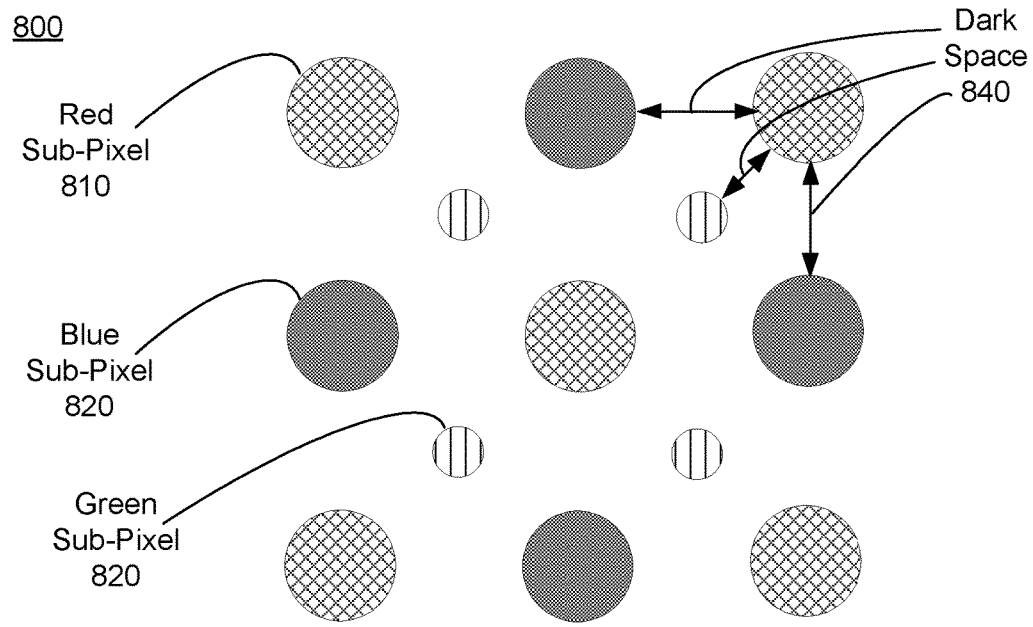
FIG. 8A is an example array of sub-pixels on an electronic display element, in accordance with an embodiment

FIG. 8A is an example array 800 of sub-pixels on the display element 110. The example array 800 shown in FIG. 8A includes red sub-pixels 810, blue sub-pixels 820, and green sub-pixels 830. For example, the array 800 is portion of a PENTILE® display. In other embodiments, the array 800 may be in some other configuration (e.g., RGB).

A dark space 840 separates each sub-pixel from one or more adjacent sub-pixels. The dark space 840 is a portion of the array 800 that does not emit light, and may become visible to a user under certain circumstances (e.g., magnification) causing the screen door effect that degrades image quality. As discussed above in conjunction with FIG. 1, the Fresnel assembly 120 can serve to reduce fixed pattern noise so the dark space 840 between the sub-pixels is not visible to the user (e.g., by blurring each sub-pixel, creating a blur spot associated with each sub-pixel in the image). The blur spots are large enough so adjacent blur spots mask the dark space 840 between adjacent full pixels. In other words, for any display panel, the largest pixel fill-ratio is 100%, if there is no gap at all between sub-pixels. However, to completely get rid of the screen door artifact on the panel side, the pixel fill-ratio may be much greater (e.g., 300%), such that the sub-pixels of different colors are overlapping. This way, when only green pixels are emitting light, for example, when viewed with perfect viewing optics, there would be no gap between the sub-pixels. This is difficult to do for OLED and/or LCD display panels, but it is doable with a diffractive element such as the prism array redirection structure 125.

Figure 8B:
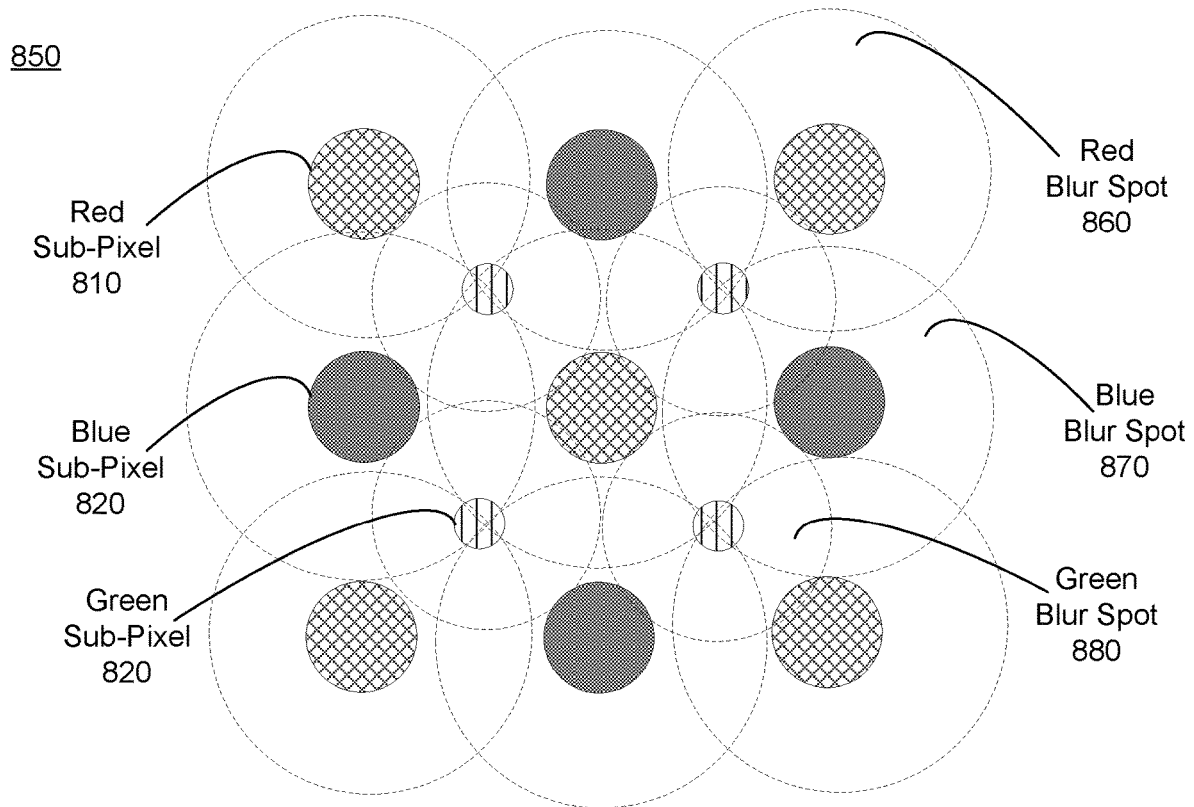
FIG. 8B is an image of an example array of sub-pixels adjusted by an optical block, in accordance with an embodiment.

FIG. 8B is an example illustrating adjustment of image data of the array 800 of FIG. 8A by the Fresnel assembly 120. As shown in FIG. 8B, each of the sub-pixels has an associated blur spot. Specifically, the red sub-pixels 810 have a corresponding red blur spot 860, the blue sub-pixels 820 have a corresponding blue blur spot 870, and the green sub-pixels 830 have a corresponding green blur spot 880. A blur spot is an area filled with an image of a blurred sub-pixel. So long as a blur spot does not overlap with a point of maximum intensity of an adjacent blur spot that is created by a sub-pixel of the same color, the two blur spots are resolvable as two adjacent pixels. In some embodiments, the three sub-pixels all overlap and creates a white pixel. The shape of the blur spot is not necessarily a circle, but is rather an area including the blurred image of a sub-pixel. The redirection structure 125 of FIG. 1A can be configured to blur each sub-pixel so the blur spots mask the dark space 940 between adjacent pixels.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display block comprising:
   a display element configured to output image light in a first band of light through a display surface, wherein the first band is in a visible spectrum;
   an optics block configured to direct light from the display element to an eyebox, and the eyebox is a region in space occupied by an eye of the user;
   an immersion layer;
   a Fresnel assembly coupled to the immersion layer, the Fresnel assembly including a plurality of surfaces that form a Fresnel lens that together span a diameter of the Fresnel assembly, the plurality of surfaces configured to transmit light in the first band and direct light in a second band incident within a first angular range at the immersion layer to a first position via two reflections off of some of the plurality of reflective surfaces, wherein the second band is in an infrared spectrum;
   an eye tracking system configured to generate eye tracking information, the eye tracking system comprising:
      an illumination source configured to illuminate portions of the eyebox with light in the second band,
      a camera located in the first position, the camera configured to capture light in the second band corresponding to light reflected from the eye of the user through the optics block and reflected by the Fresnel assembly, and
      a controller configured to determine eye tracking information using the captured light in the second band, and
   wherein the image light is adjusted based on the eye tracking information.

2. The display block of claim 1, wherein the display element is configured to output image light via a plurality of sub-pixels, the sub-pixels separated from each other by a dark space, and the Fresnel assembly is configured to generate blur spots in the image light that mask the dark space between adjacent sub-pixels, with each blur spot corresponding to a blurred image of a sub-pixel in the image light.

3. The display block of claim 1, wherein the light in the first band is in one polarization and the light in the second band is in an orthogonal polarization.

4. The display block of claim 1, wherein the immersion layer has the same refractive index as that of a material from which the Fresnel assembly is composed.

5. The display block of claim 4, wherein the Fresnel assembly is directly coupled to the display surface of the display element.

6. The display block of claim 1, wherein light incident within a second angular range at the immersion layer is redirected to the first position after one reflection off of some of the plurality of surfaces and undergoing at most a single total internal reflection off of an immersion layer-air interface, and the first angular range is different than the second angular range.

7. The display block of claim 1, wherein the plurality of surfaces is a first set of reflective surfaces and the Fresnel assembly further includes a second set of reflective surfaces, the display block further comprising:
a second camera at a second position, and light in the second band incident on the second set of reflective surfaces is reflected toward the second position.

8. The display block of claim 1, wherein the plurality of surfaces is a first set of reflective surfaces, the Fresnel assembly further includes a second set of reflective surfaces, and the illumination source is positioned at a second position such that light in the second band emitted by the illumination source is reflected by the second set of reflective surfaces toward the eyebox.

9. The display block of claim 1, wherein the plurality of surfaces are coated with a dichroic film that is reflective in the second band of light and transmissive in the first band of light.

10. A display block comprising:
a display element configured to output image light in a first band of light through a display surface, wherein the first band is in a visible spectrum;
an optics block configured to direct light from the display element to an eyebox, and the eyebox is a region in space occupied by an eye of the user;
an immersion layer;
a Fresnel assembly coupled to the immersion layer, the Fresnel assembly including a plurality of surfaces that form a Fresnel lens that together span a diameter of the Fresnel assembly, the plurality of surfaces configured to transmit light in the first band and direct light in a second band incident within a first angular range at the immersion layer to a first position via two reflections off of some of the plurality of surfaces, wherein the second band is in an infrared spectrum;
an illumination source configured to illuminate portions of the eyebox with light in the second band; and
a camera located in the first position, the camera configured to capture light in the second band corresponding to light reflected from the eye of the user and reflected by the Fresnel assembly.

11. The display block of claim 10, wherein the immersion layer has the same refractive index as that of a material from which the Fresnel assembly is composed.

12. The display block of claim 11, wherein the Fresnel assembly is directly coupled to the display surface of the display element.

13. The display block of claim 10, wherein light incident within a second angular range at the immersion layer is redirected to the first position after one reflection off of some of the plurality of surfaces and undergoing at most a single total internal reflection off of an immersion layer-air interface, and the first angular range is different than the second angular range.

14. The display block of claim 10, wherein the plurality of surfaces is a first set of reflective surfaces, and the Fresnel assembly further includes a second set of reflective surfaces, the display block further comprising:
a second camera at a second position, and light in the second band incident on the second set of reflective surfaces is reflected toward the second position.

15. The display block of claim 10, wherein the plurality of surfaces is a first set of reflective surfaces, the Fresnel assembly further includes a second set of reflective surfaces, and the illumination source is positioned at a second position such that light in the second band emitted by the illumination source is reflected by the second set of reflective surfaces toward the eye.

* * * * *